United States Patent
Chen et al.

(10) Patent No.: US 10,880,838 B2
(45) Date of Patent: Dec. 29, 2020

(54) METHOD OF UPLINK POWER CONTROL, TERMINAL DEVICE AND NETWORK DEVICE

(71) Applicant: GUANGDONG OPPO MOBILE TELECOMMUNICATIONS CORP., LTD., Dongguan, Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/694,132

(22) Filed: Nov. 25, 2019

(65) Prior Publication Data
US 2020/0092820 A1 Mar. 19, 2020

Related U.S. Application Data

(63) Continuation of application No. PCT/CN2018/083092, filed on Apr. 13, 2018.

(51) Int. Cl.
*H04W 52/08* (2009.01)
*H04L 5/00* (2006.01)
(Continued)

(52) U.S. Cl.
CPC .......... *H04W 52/08* (2013.01); *H04L 5/0051* (2013.01); *H04L 5/0092* (2013.01);
(Continued)

(58) Field of Classification Search
CPC ... H04W 52/08; H04W 52/58; H04W 52/146; H04W 72/042; H04W 80/08; H04L 5/0092; H04L 5/0051; H04L 25/0226
See application file for complete search history.

(56) References Cited

U.S. PATENT DOCUMENTS

2014/0071903 A1* 3/2014 Sorrentino .......... H04W 52/325
370/329
2014/0269452 A1 9/2014 Papasakellariou
(Continued)

FOREIGN PATENT DOCUMENTS

| CN | 103379605 | 10/2013 |
| CN | 104039000 | 9/2014 |

(Continued)

OTHER PUBLICATIONS

Vivo, "Remaining issues on NR UL power control," 3GPP TSG RAN WG1 Meeting #92, R1-1801546, Mar. 2018, 5 pages.
(Continued)

*Primary Examiner* — Rina C Pancholi
(74) *Attorney, Agent, or Firm* — Hodgson Russ LLP

(57) ABSTRACT

The present application discloses a method, a terminal device, a network device and a computer storage medium of uplink power control, wherein the method comprises: determining number of bits of a Transmission Power Control TPC command field of the terminal device in Downlink Control Information DCI based on number of Bandwidth Parts BWPs transmitting an uplink signal or number of closed-loop power control processes associated with an uplink signal; determining a closed-loop power adjustment factor of at least one BWP transmitting the uplink signal or a closed-loop power adjustment factor of at least one closed-loop power control process associated with the uplink signal based on a TPC command in the TPC command field.

20 Claims, 2 Drawing Sheets

---

101

Determining Number of Bits of Transmission Power Control TPC Command Domain of Terminal Device in Downlink Control Information DCI Based on Number of Bandwidth Parts BWPs Transmitting Uplink Signal Or Number of Closed-Loop Power Control Processes Associated with Uplink Signal

↓

102

Determining Closed-Loop Power Adjustment Factor of at Least One BWP Transmitting Uplink Signal Or Closed-Loop Power Adjustment Factor of at Least One Closed-Loop Power Control Process Associated with Uplink Signal Based on TPC Command in TPC Command Domain

(51) Int. Cl.
  *H04L 25/02* (2006.01)
  *H04W 52/14* (2009.01)
  *H04W 52/58* (2009.01)
  *H04W 72/04* (2009.01)
  *H04W 80/08* (2009.01)

(52) U.S. Cl.
  CPC ....... *H04L 25/0226* (2013.01); *H04W 52/146* (2013.01); *H04W 52/58* (2013.01); *H04W 72/042* (2013.01); *H04W 80/08* (2013.01)

(56) References Cited

U.S. PATENT DOCUMENTS

2018/0310257 A1* 10/2018 Papasakellariou .... H04W 52/50
2019/0289513 A1*  9/2019 Jeon ..................... H04W 52/40

FOREIGN PATENT DOCUMENTS

| | | |
|---|---|---|
| CN | 104837191 | 8/2015 |
| CN | 107529209 | 12/2017 |
| WO | 2013119167 | 8/2013 |
| WO | 2014107051 | 7/2014 |
| WO | 2014134955 | 9/2014 |

OTHER PUBLICATIONS

WIPO, ISR for PCT/CN2018/083092, Dec. 27, 2018.
EPO, Office Action for EP Application No. 18914290.4, dated Jul. 15, 2020.
SIPO, First Office Action for CN Application No. 201911303137.3, dated Nov. 3, 2020.

* cited by examiner

METHOD OF UPLINK POWER CONTROL, TERMINAL DEVICE AND NETWORK DEVICE

CROSS-REFERENCE TO RELATED APPLICATION

This application is a continuation of International Application No. PCT/CN2018/083092, filed on Apr. 13, 2018, the entire disclosure of which is incorporated herein by reference.

TECHNICAL FIELD

The present application relates to the field of information processing technologies, and in particular, to a method of uplink power control, a terminal device, a network device and a computer storage medium.

BACKGROUND

The current transmission power of PUSCH can be calculated by the following formula:

$$P_{PUSCH,f,c}(i, j, q_d, l) = \min \begin{Bmatrix} P_{CMAX,f,c}(i), \\ P_{0\_PUSCH,f,c}(j) + 10\log_{10}(2^\mu \cdot M_{RB,f,c}^{PUSCH}(i)) + \alpha_{f,c}(j) \cdot PL_{f,c}(q_d) + \\ \Delta_{TF,f,c}(i) + f_{f,c}(i, l) \end{Bmatrix};$$

wherein i represents an index of the primary PUSCH transmission, j is an index of an open-loop power control parameter, wherein $P_{0\_PUSCH,f,c}(j)$ and $\alpha_{f,c}(j)$ are open-loop power control parameters, $PL_{f,c}(q_d)$ is an estimated path loss value measured based on a downlink reference signal, and $f_{f,c}(i, l)$ is a closed-loop power adjustment factor, and l is an index of a closed-loop power control process. The values of j and l, and the downlink reference signal which is used to measure the estimated path loss value $PL_{f,c}(q_d)$ can be obtained based on SRI (SRS Resource Indicator) information included in DCI. The network side pre-configures a correspondence between different SRI states and {j, qd, l}, and then indicates the {j, qd, l} used by a current transmission through SRI.

For PUCCH, the network side pre-configures a correspondence between different PUCCH-Spatial relation Info and {j, qd, l}, and then determines the {j, qd, l} used by a current PUCCH transmission thorough a currently used PUCCH-Spatial relation Info. The network side indicates all available PUCCH-Spatial relation Info through a RRC signaling, and then indicates a currently used PUCCH-Spatial relation Info through MAC CE.

For PUSCH and PUCCH, a Transmission Power Control (TPC) command can be obtained by dedicated Downlink Control Information (DCI) which is dedicated to carrying a TPC command, so as to determine the closed-loop power adjustment factor. The DCI adopts DCI format 2-2 and performs scrambling by using PUSCH-TPC-RNTI or PUCCH-TPC-RNTI, and may include TPC commands of multiple terminals. In NR, PUSCH and PUCCH may be transmitted simultaneously on multiple BWPs, and both can support multiple closed-loop power control processes. In this case, how to obtain a respective TPC command of each closed-loop power control process on each BWP is a problem need to be solved.

SUMMARY

Embodiments of the present application provide a method of uplink power control, a terminal device, a network device and a computer storage medium.

An embodiment of the present application provides a method of uplink power control, which is applied to a terminal device, comprising:

determining number of bits of a Transmission Power Control TPC command field of the terminal device in Downlink Control Information DCI based on number of Bandwidth Parts BWPs transmitting an uplink signal or number of closed-loop power control processes associated with an uplink signal;

determining a closed-loop power adjustment factor of at least one BWP transmitting the uplink signal or a closed-loop power adjustment factor of at least one closed-loop power control process associated with the uplink signal based on a TPC command in the TPC command field.

An embodiment of the present application provides a method of uplink power control, which is applied to a network device, comprising:

determining number of bits of a Transmission Power Control TPC command field of a terminal device in Downlink Control Information DCI based on number of Bandwidth Parts BWPs transmitting an uplink signal or number of closed-loop power control processes associated with an uplink signal;

transmitting the TPC command field to the terminal device through the DCI.

An embodiment of the present application provides a terminal device, comprising:

a first processing unit, configured to determine number of bits of a Transmission Power Control TPC command field of the terminal device in Downlink Control Information DCI based on number of Bandwidth Parts BWPs transmitting an uplink signal or number of closed-loop power control processes associated with an uplink signal;

and configured to determine a closed-loop power adjustment factor of at least one BWP transmitting the uplink signal or a closed-loop power adjustment factor of at least one closed-loop power control process associated with the uplink signal based on a TPC command in the TPC command field.

An embodiment of the present application provides a network device, comprising:

a second processing unit, further configured to determine number of bits of a Transmission Power Control TPC command field of a terminal device in Downlink Control Information DCI based on number of Bandwidth Parts BWPs transmitting an uplink signal or number of closed-loop power control processes associated with an uplink signal;

a second communication unit, configured to transmit the TPC command field to the terminal device through the DCI.

An embodiment of the present application provides a terminal device, comprising: a processor and a memory for storing computer programs executable on the processor, wherein the processor is configured to perform the steps of the foregoing methods when the computer programs are executed.

An embodiment of the present application provides a network device, comprising: a processor and a memory for storing computer programs executable on the processor, wherein the processor is configured to perform the steps of the foregoing methods when the computer programs are executed.

An embodiment of the present application provides a computer storage medium, wherein the computer storage medium stores computer executable instructions, wherein the steps of the foregoing methods are implemented when the computer executable instructions are executed.

DETAILED DESCRIPTION

In order to understand features and technical contents of embodiments of the present application in more detail, implementations of the embodiments of the present application is described in detail below with reference to the drawings. The drawings are for illustrative purposes only and are not intended to limit the embodiments of the present application.

Embodiment 1

Figure 1:
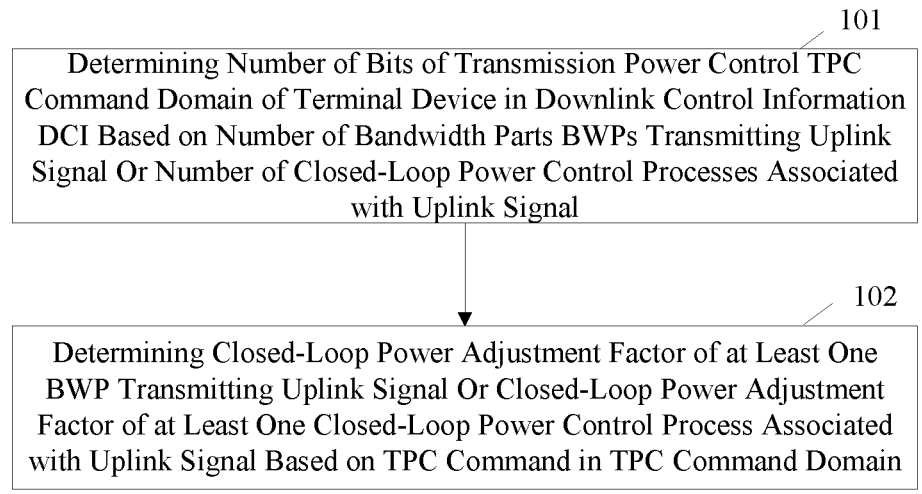
FIG. 1 is a flowchart 1 of a method of uplink power control provided by an embodiment of the present application.

An embodiment of the present application provides a method of uplink power control, which is applied to a terminal device, as shown in FIG. 1, comprising:

step 101: determining number of bits of a Transmission Power Control TPC command field of the terminal device in Downlink Control Information DCI based on number of Bandwidth Parts BWPs transmitting an uplink signal or number of closed-loop power control processes associated with an uplink signal;

step 102: determining a closed-loop power adjustment factor of at least one BWP transmitting the uplink signal or a closed-loop power adjustment factor of at least one closed-loop power control process associated with the uplink signal based on a TPC command in the TPC command field.

The terminal device in this embodiment can be understood as a terminal with a communication function in a communication system, such as a mobile phone or the like.

In the foregoing step 101, the method of determining the number of the closed-loop power control processes associated with the uplink signal may include at least one of the following:

determining the number of the closed-loop power control processes associated with the uplink signal based on a current transmission type of the uplink signal; that is, determining based on a transmission type of the current uplink signal;

determining the number of the closed-loop power control processes associated with the uplink signal based on configuration of a high-layer signaling;

determining the number of the closed-loop power control processes associated with the uplink signal based on the number of BWPs which transmit the uplink signal and the number of the closed-loop power control processes on each BWP which transmits the uplink signal;

determining the number of the closed-loop power control processes associated with the uplink signal based on a first correspondence configured by a high-layer signaling when the uplink signal is PUSCH, wherein the first correspondence is a correspondence between an SRI state and a closed-loop power control process;

determining the number of the closed-loop power control processes associated with the uplink signal based on a second correspondence configured by a high-layer signaling when the uplink signal is PUCCH, wherein the second correspondence is a correspondence between PUCCH-spatial correlation info and a closed-loop power control process;

determining the number of the closed-loop power control processes associated with the uplink signal based on a third correspondence configured by a high-layer signaling when the uplink signal is SRS, wherein the third correspondence is a correspondence between an SRS-spatial correlation info and a closed-loop power control process.

Further, determining the number of the closed-loop power control processes associated with the uplink signal based on a current transmission type of the uplink signal comprises:

determining the number of the closed-loop power control processes associated with the uplink signal based on that the uplink signal is grant-free type or scheduling-based type, for example, the uplink signal is an uplink signal based on grant-free (terminal autonomous transmission) or an uplink signal based on scheduling, and a corresponding number is determined based on this kind of type, for example, the number of the closed-loop power control processes associated with the uplink signal based on grant-free is 1; the number of the associated closed-loop power control processes based on scheduling is 2 or a value configured by a network side;

and/or, determining the number of the closed-loop power control processes for each BWP based on a transmission type on each BWP in the at least one BWP when the terminal device configures at least one BWP; wherein the at least one can be understood as one, of course, and more.

When the number of the closed-loop power control processes associated with the uplink signal is determined based on configuration of a high-layer signaling, a number of the PUSCH and the PUCCH can be independently configured. If the terminal is configured with multiple BWPs, the network side can respectively configure a number of the closed-loop power control processes for each BWP.

The determining the number of the closed-loop power control processes associated with the uplink signal based on the number of BWPs which transmit the uplink signal and the number of the closed-loop power control processes on each BWP of the uplink signal comprises: taking a total number of the closed-loop power control processes included in all BWPs transmitting the uplink signal as the number of the closed-loop power control processes associated with the uplink signal.

That is, it is determined based on the number of BWPs transmitting the uplink signal and the number of the closed-loop power control processes on each BWP.

Specifically, the number of BWPs transmitting the uplink signal may be one of the following: number of BWPs which simultaneously transmit the uplink signal, number of uplink BWPs which are currently activated, number of uplink BWPs which are configured by a network side for the terminal device.

It should be noted that, for the latter two cases, these BWPs may not be simultaneously used to transmit the uplink signal and only one or part of the BWPs can be used to transmit the uplink signal at the same time. The terminal may transmit the uplink signal by using different BWPs at different times.

The determining the number of the closed-loop power control processes associated with the uplink signal based on a first correspondence configured by a high-layer signaling when the uplink signal is PUSCH comprises at least one of the following three cases:

Case 1:

The number of different closed-loop power control processes included in the first correspondence is determined as the number of the closed-loop power control processes associated with the uplink signal.

For example, if the first correspondence indicates that all SRI states correspond to a same closed-loop power control process, the number of the closed-loop power control processes is 1. If the correspondence indicates that part of SRI states correspond to a closed-loop power control process 0 and other SRI states correspond to a closed-loop power control process 1, the number of the closed-loop power control processes is 2.

Case 2:

The number of the closed-loop power control processes associated with the uplink signal is determined to be 1 when the uplink signal is PUSCH and the terminal device is not configured with the SRI or the first correspondence.

The number of the closed-loop power control processes associated with the uplink signal is determined to be 1 when the uplink signal is PUSCH and the terminal device is not configured with the SRI or the first correspondence. That is, if the terminal is not configured with the SRI or the correspondence between the SRI state and the closed-loop power control process, the number of the closed-loop power control processes is 1.

Case 3:

The number of the closed-loop power control processes associated with the uplink signal is determined based on the first correspondence configured on each BWP in at least one BWP when the uplink signal is PUSCH and the terminal device is configured with the at least one BWP.

The number of the closed-loop power control processes associated with the uplink signal is determined based on the first correspondence configured on each BWP in at least one BWP when the uplink signal is PUSCH and the terminal device is configured with the at least one BWP. That is, if the terminal is configured with multiple BWPs, the number can be respectively determined based on the correspondence configured on each BWP.

It should be noted that the first correspondence may be understood as a correspondence between the SRI state and the closed-loop power control process. The SRI is an SRS Resource indicator, which can be obtained by scheduling DCI of the PUSCH to carry the SRI.

The number of the closed-loop power control processes associated with the uplink signal is determined based on a second correspondence configured by a high-layer signaling when the uplink signal is PUCCH. That is, if the uplink signal is PUCCH, it can be determined based on a correspondence, which is configured by a high-layer signaling, between PUCCH-Spatial Relation Info and a closed-loop power control process. Specifically, at least one of the following three cases may be included:

Case 1:

The terminal may determine number of different closed-loop power control processes included in the second correspondence as the number of the closed-loop power control processes associated with the uplink signal.

For example, if the correspondence indicates that all PUCCH-Spatial Relation Info correspond to a same closed-loop power control process, the number of the closed-loop power control processes is 1. If the second correspondence indicates that part of PUCCH-Spatial Relation Info correspond to a closed-loop power control process 0 and other PUCCH-Spatial Relation Info correspond to a closed-loop power control process 1, the number of the closed-loop power control processes is 2.

Case 2:

The number of the closed-loop power control processes associated with the uplink signal is determined to be 1 when the uplink signal is PUCCH and the terminal device is not configured with the PUCCH-spatial correlation info or the second correspondence.

If the terminal is not configured with PUCCH-Spatial Relation Info or a second correspondence between the PUCCH-Spatial Relation Info and the closed-loop power control process, the number of the closed-loop power control processes is 1.

Case 3:

The number of the closed-loop power control processes associated with the uplink signal is determined based on a second correspondence configured on each BWP in at least one BWP when the uplink signal is PUCCH and the terminal device is configured with the at least one BWP. That is to say, if the terminal is configured with multiple BWPs, the number can be respectively determined based on the second correspondence configured on each BWP.

The number of the closed-loop power control processes associated with the uplink signal is determined based on a third correspondence configured by a high-layer signaling when the uplink signal is SRS. That is, if the uplink signal is SRS, it can be determined based on a correspondence, which is configured by a high-layer signaling, between SRS-Spatial Relation Info and a closed-loop power control process. Specifically, at least one of the following three cases may be included:

Case 1:

The terminal may determine number of different closed-loop power control processes included in the third correspondence as the number of the closed-loop power control processes associated with the uplink signal.

For example, if the third correspondence indicates that all SRS-Spatial Relation Info correspond to a same closed-loop power control process, the number of the closed-loop power control processes is 1. If the third correspondence indicates that part of SRS-Spatial Relation Info correspond to a closed-loop power control process 0 and other SRS-Spatial Relation Info correspond to a closed-loop power control process 1, the number of the closed-loop power control processes is 2.

Case 2:

The number of the closed-loop power control processes associated with the uplink signal is determined to be 1 when the uplink signal is SRS and the terminal device is not configured with the SRS-spatial correlation info or the third correspondence.

That is, if the terminal is not configured with SRS-Spatial Relation Info or a third correspondence between the SRS-Spatial Relation Info and the closed-loop power control process, the number of the closed-loop power control processes is 1.

Case 3:

The number of the closed-loop power control processes associated with the uplink signal is determined based on the third correspondence configured on each BWP in at least one BWP when the uplink signal is SRS and the terminal device is configured with the at least one BWP. That is to say, if the terminal is configured with multiple BWPs, the number can be respectively determined based on the correspondence configured on each BWP.

The number of BWPs transmitting the uplink signal may be number of BWPs which simultaneously transmit the uplink signal, number of uplink BWPs which are currently activated, or number of uplink BWPs which are configured by a network side for the terminal device. For the latter two cases, these BWPs are not always possible to simultaneously transmit the uplink signal, and only one or part of the BWPs can be used to transmit the uplink signal at the same time. The terminal may transmit the uplink signal by using different BWPs at different times.

Before determining the number of BWPs transmitting the uplink signal or the number of the closed-loop power control processes associated with the uplink signal, the method further comprises: determining that the number of bits of the TPC command field in the DCI is 2. Specifically, the DCI includes a TPC command field of the terminal. For example, before the terminal receives the number of BWPs configured by the network side or the number of the closed-loop power control processes associated with the uplink signal, the terminal assumes that the number of bits of the TPC command field in the DCI is 2.

The method comprises: determining that the number of bits in the TPC command field is 2*N or 2+log 2(N) if the number of BWPs transmitting the uplink signal is N or the number of the closed-loop power control processes associated with the uplink signal is N.

The DCI is at least one of the following: DCI carrying a TPC command of PUSCH; DCI carrying a TPC command of PUCCH; DCI carrying a TPC command of SRS.

It should be noted that the format of the DCI may be: DCI format 2-2 or DCI format 2-3, and the DCI is scrambled by using PUSCH-TPC-RNTI or PUCCH-TPC-RNTI or SRS-TPC-RNTI. The DCI can be used to indicate a TPC command on a BWP, and can also be used to indicate a TPC command on different BWPs.

The uplink signal is one of the following: PUSCH, PUCCH and SRS.

Specifically, if the uplink signal is PUSCH or PUCCH, the format of the DCI is DCI format 2-2, and is scrambled by PUSCH-TPC-RNTI or PUCCH-TPC-RNTI. If the uplink signal is SRS, then the format of the DCI is DCI format 2-3 and is scrambled by SRS-TPC-RNTI.

Based on the above solutions, the embodiment may provide a processing method for further determining a TPC command field. For example, the method may further comprises: determining the TPC command field of the terminal device from the DCI based on a position index of TPC command indicated by a network side and a number of bits of the TPC command field.

The method of obtaining a position index of TPC command may be: receiving the position index of TPC command indicated by the network side through a RRC signaling. The position index of TPC command indicates a start bit of the TPC command field of the terminal device in the DCI.

Specifically, the position index may be in units of 1 bit. That is, the start bit of the TPC command field may be in any position in the DCI. Or the position index may be in units of 2 bits. That is, the start bit of the TPC command field may be any even bit in the bits of the DCI (e.g. the index of bit is 0, 2, 4, . . . ).

The position index of TPC command comprises a position index of at least one TPC command. Each TPC command corresponds to a BWP or a closed-loop power control process corresponding to a BWP. If the TPC command field includes position indexes of multiple TPC commands and each TPC command corresponds to a BWP or a closed-loop power control process on a BWP, the network side may configure independent position indexes for the multiple TPC commands. That is, the network side can independently configure a position index of TPC command for each BWP or each closed-loop power control process. For example, the k-th position index corresponds to the TPC command of the k-th BWP or the k-th closed-loop power control process.

Typically, the TPC command field occupies continuous bits in the DCI. For example, if the TPC command field comprises 2 TPC commands, the two TPC commands are two continuous TPC commands in the DCI.

The position index of TPC command indicates the k-th bit, and the number of bits of the TPC command field is M, then the bits occupied by the TPC command field of the terminal device are the {k, k+1, . . . , k+M−1} bits in the DCI.

In the above step 102, if the TPC command field is 2*N bits, it includes N 2-bit TPC commands and the n-th TPC command is used for the n-th BWP or the n-th closed-loop power control process. If the TPC command field is 2+log 2(N) bits, the first two bits are a TPC command and the subsequent log 2(N) bits indicate the BWP or closed-loop power control process corresponding to the TPC command, or the last two bits are a TPC command and the preceding log 2 (N) bits indicate the BWP or closed-loop power control process corresponding to the TPC command.

Based on step 102, the embodiment may further include the following steps:

Determining a transmission power of the uplink signal based on a closed-loop power adjustment factor of a BWP currently transmitting the uplink signal or a closed-loop power adjustment factor of a closed-loop power control process currently used by the uplink signal; transmitting the uplink signal based on the determined transmission power. The method of determining the transmission power of the uplink signal may be calculated based on any closed-loop power adjustment factor, and the manner of calculation is not described herein.

It can be seen that, by adopting the foregoing solution, the corresponding TPC command can be determined based on the number of BWPs of the uplink signal or the number of the closed-loop power control processes, and the power adjustment factor corresponding to the uplink signal is determined based on the TPC command, thereby reducing DCI overhead of the TPC command of one terminal as much as possible, saving unnecessary DCI overhead, and performing closed-loop power control of more terminals and more BWPs through one DCI.

Embodiment 2

Figure 2:
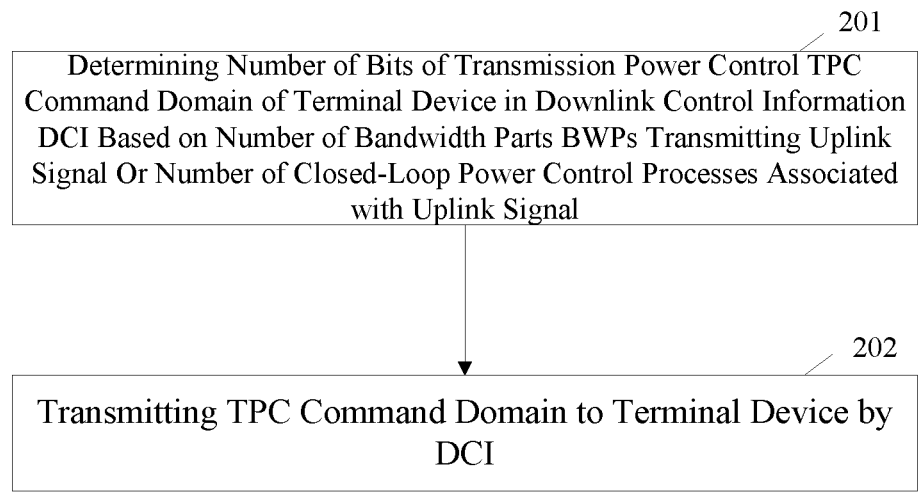
FIG. 2 is a flowchart 2 of a method of uplink power control provided by an embodiment of the present application.

An embodiment of the present application provides a method of uplink power control, which is applied to a network device, as shown in FIG. 2, comprising:

step 201: determining number of bits of a Transmission Power Control TPC command field of a terminal device in Downlink Control Information DCI based on number of Bandwidth Parts BWPs transmitting an uplink signal or number of closed-loop power control processes associated with an uplink signal;

step 202: transmitting the TPC command field to the terminal device by the DCI.

The terminal device in this embodiment can be understood as a terminal with a communication function in a communication system, such as a mobile phone or the like.

The above method of determining the number of the closed-loop power control processes associated with the uplink signal may include at least one of the following:

determining the number of the closed-loop power control processes associated with the uplink signal based on a current transmission type of the uplink signal; that is, determining based on a transmission type of the current uplink signal;

determining the number of the closed-loop power control processes associated with the uplink signal based on configuration of a high-layer signaling;

determining the number of the closed-loop power control processes associated with the uplink signal based on the number of BWPs which transmit the uplink signal and the number of the closed-loop power control processes on each BWP which transmits the uplink signal;

determining the number of the closed-loop power control processes associated with the uplink signal based on a first correspondence configured by a high-layer signaling when the uplink signal is PUSCH, wherein the first correspondence is a correspondence between an SRI state and a closed-loop power control process;

determining the number of the closed-loop power control processes associated with the uplink signal based on a second correspondence configured by a high-layer signaling when the uplink signal is PUCCH, wherein the second correspondence is a correspondence between PUCCH-spatial correlation info and a closed-loop power control process;

determining the number of the closed-loop power control processes associated with the uplink signal based on a third correspondence configured by a high-layer signaling when the uplink signal is SRS, wherein the third correspondence is a correspondence between an SRI-spatial correlation info and a closed-loop power control process.

Further, the determining the number of the closed-loop power control processes associated with the uplink signal based on a current transmission type of the uplink signal comprises:

determining the number of the closed-loop power control processes associated with the uplink signal based on that the uplink signal is grant-free type or scheduling-based type; for example, the uplink signal is an uplink signal based on grant-free (terminal autonomous transmission) or an uplink signal based on scheduling, and a corresponding number is determined based on this kind of type, for example, the number of the closed-loop power control processes associated with the uplink signal based on grant-free is 1; the number of the associated closed-loop power control processes based on scheduling is 2 or a value configured by a network side;

and/or, determining the number of the closed-loop power control processes for each BWP based on a transmission type on each BWP in the at least one BWP when the terminal device configures at least one BWP; wherein the at least one can be understood as one, of course, and more.

When the number of the closed-loop power control processes associated with the uplink signal is determined based on configuration of a high-layer signaling, a number of the PUSCH and the PUCCH may be independently configured. If the terminal is configured with multiple BWPs, the network side can respectively configure a number of the closed-loop power control processes for each BWP.

The determining the number of the closed-loop power control processes associated with the uplink signal based on the number of BWPs which transmit the uplink signal and the number of the closed-loop power control processes on each BWP of the uplink signal comprises: taking a total number of the closed-loop power control processes included in all BWPs transmitting the uplink signal as the number of the closed-loop power control processes associated with the uplink signal.

That is, it is determined based on the number of BWPs transmitting the uplink signal and the number of the closed-loop power control processes on each BWP.

Specifically, the number of BWPs transmitting the uplink signal may be one of the following: number of BWPs which simultaneously transmit the uplink signal; number of uplink BWPs which are currently activated; number of uplink BWPs which are configured by a network side for the terminal device.

It should be noted that, for the latter two cases, these BWPs may not be simultaneously used to transmit the uplink signal and only one or part of the BWPs can be used to transmit the uplink signal at the same time. The terminal may transmit the uplink signal by using different BWPs at different times.

The determining the number of the closed-loop power control processes associated with the uplink signal based on a first correspondence configured by a high-layer signaling when the uplink signal is PUSCH comprises at least one of the following three cases:

Case 1:

The number of different closed-loop power control processes included in the first correspondence is determined as the number of the closed-loop power control processes associated with the uplink signal.

For example, if the first correspondence indicates that all SRI states correspond to a same closed-loop power control process, the number of the closed-loop power control processes is 1. If the correspondence indicates that part of SRI states correspond to a closed-loop power control process 0 and other SRI states correspond to a closed-loop power control process 1, the number of the closed-loop power control processes is 2.

Case 2:

The number of the closed-loop power control processes associated with the uplink signal is determined to be 1 when the uplink signal is PUSCH and the terminal device is not configured with the SRI or the first correspondence.

The number of the closed-loop power control processes associated with the uplink signal is determined to be1 when the uplink signal is PUSCH and the terminal device is not configured with the SRI or the first correspondence. That is, if the terminal is not configured with the SRI or the correspondence between the SRI state and the closed-loop power control process, the number of the closed-loop power control processes is 1.

Case 3:

The number of the closed-loop power control processes associated with the uplink signal is determined based on the first correspondence configured on each BWP in at least one BWP when the uplink signal is PUSCH and the terminal device is configured with the at least one BWP.

The number of the closed-loop power control processes associated with the uplink signal is determined based on the first correspondence configured on each BWP in at least one BWP when the uplink signal is PUSCH and the terminal device is configured with the at least one BWP. That is, if the terminal is configured with multiple BWPs, the number can be respectively determined based on the correspondence configured on each BWP.

It should be noted that the first correspondence may be understood as a correspondence between the SRI state and the closed-loop power control process. The SRI is an SRS Resource indicator, which can be obtained by scheduling DCI of the PUSCH to carry the SRI.

The number of the closed-loop power control processes associated with the uplink signal is determined based on a second correspondence configured by a high-layer signaling when the uplink signal is PUCCH. That is, if the uplink signal is PUCCH, a number of the different closed-loop power control processes included in the correspondence can be determined based on a correspondence, which is configured by a high-layer signaling, between PUCCH-Spatial Relation Info and a closed-loop power control process. Specifically, at least one of the following three cases may be included:

Case 1:

The terminal may determine number of different closed-loop power control processes included in the second correspondence as the number of the closed-loop power control processes associated with the uplink signal.

For example, if the correspondence indicates that all PUCCH-Spatial Relation Info correspond to a same closed-loop power control process, the number of the closed-loop power control processes is 1. If the second correspondence indicates that part of PUCCH-Spatial Relation Info correspond to a closed-loop power control process 0 and other PUCCH-Spatial Relation Info correspond to a closed-loop power control process 1, the number of the closed-loop power control processes is 2.

Case 2:

The number of the closed-loop power control processes associated with the uplink signal is determined to be 1 when the uplink signal is PUCCH and the terminal device is not configured with the PUCCH-spatial correlation info or the second correspondence.

If the terminal is not configured with PUCCH-Spatial Relation Info or a second correspondence between the PUCCH-Spatial Relation Info and the closed-loop power control process, the number of the closed-loop power control processes is 1.

Case 3:

The number of the closed-loop power control processes associated with the uplink signal is determined based on a second correspondence configured on each BWP in at least one BWP when the uplink signal is PUCCH and the terminal device is configured with the at least one BWP. That is to say, if the terminal is configured with multiple BWPs, the number can be respectively determined based on the second correspondence configured on each BWP.

The number of the closed-loop power control processes associated with the uplink signal is determined based on a third correspondence configured by a high-layer signaling when the uplink signal is SRS. That is, if the uplink signal is SRS, a number of the different closed-loop power control processes included in the correspondence can be determined based on a correspondence, which is configured by a high-layer signaling, between SRS-Spatial Relation Info and a closed-loop power control process. Specifically, at least one of the following three cases may be included:

Case 1:

The terminal may determine number of different closed-loop power control processes included in the third correspondence as the number of the closed-loop power control processes associated with the uplink signal.

For example, if the third correspondence indicates that all SRS-Spatial Relation Info correspond to a same closed-loop power control process, the number of the closed-loop power control processes is 1. If the third correspondence indicates that part of SRS-Spatial Relation Info correspond to a closed-loop power control process 0 and other SRS-Spatial Relation Info correspond to a closed-loop power control process 1, the number of the closed-loop power control processes is 2.

Case 2:

The number of the closed-loop power control processes associated with the uplink signal is determined to be 1 when the uplink signal is SRS and the terminal device is not configured with the SRS-spatial correlation info or the third correspondence.

That is, if the terminal is not configured with SRS-Spatial Relation Info or a third correspondence between the SRS-Spatial Relation Info and the closed-loop power control process, the number of the closed-loop power control processes is 1.

Case 3:

The number of the closed-loop power control processes associated with the uplink signal is determined based on the third correspondence configured on each BWP in at least one BWP when the uplink signal is SRS and the terminal device is configured with the at least one BWP. That is to say, if the terminal is configured with multiple BWPs, the number can be respectively determined based on the correspondence configured on each BWP.

The number of BWPs transmitting the uplink signal is: number of BWPs which simultaneously transmit the uplink signal; or, number of uplink BWPs which are currently activated; or, number of uplink BWPs which are configured for the terminal device.

For the latter two cases, these BWPs may not be simultaneously used to transmit the uplink signal and only one or part of the BWPs can be used to transmit the uplink signal at the same time. The terminal may transmit the uplink signal by using different BWPs at different times.

Before determining the number of BWPs transmitting the uplink signal or the number of the closed-loop power control processes associated with the uplink signal, the method further comprises: determining that the number of bits of the TPC command field in the DCI is 2. Specifically, the DCI includes a TPC command field of the terminal. For example, before the terminal receives the number of BWPs configured by the network side or the number of the closed-loop power control processes associated with the uplink signal, the terminal assumes that the number of bits of the TPC command field in the DCI is 2.

The method comprises: determining that the number of bits in the TPC command field is 2*N or 2+log 2(N) if the number of BWPs transmitting the uplink signal is N or the number of the closed-loop power control processes associated with the uplink signal is N.

The DCI is at least one of the following: DCI carrying a TPC command of PUSCH; DCI carrying a TPC command of PUCCH; DCI carrying a TPC command of SRS.

It should be noted that the format of the DCI may be: DCI format 2-2 or DCI format 2-3, and the DCI is scrambled by using PUSCH-TPC-RNTI or PUCCH-TPC-RNTI or SRS-TPC-RNTI. The DCI can be used to indicate a TPC command on a BWP, and can also be used to indicate a TPC command on different BWPs.

The uplink signal is one of the following: PUSCH, PUCCH and SRS.

Specifically, if the uplink signal is PUSCH or PUCCH, the format of the DCI is DCI format 2-2, and is scrambled by PUSCH-TPC-RNTI or PUCCH-TPC-RNTI. If the uplink signal is SRS, then the format of the DCI is DCI format 2-3 and is scrambled by SRS-TPC-RNTI.

Based on the above solutions, the embodiment may provide a processing method for further determining a TPC command field. For example, the method may further comprises: indicating a position index of TPC command to the terminal device to cause the terminal device to determine the TPC command field from the DCI based on a position of TPC command and a number of bits of the TPC command field.

The method of obtaining a position index of TPC command may be: indicating, by the network device, the position index of TPC command through a RRC signaling. The position index of TPC command indicates a start bit of the TPC command field of the terminal device in the DCI.

Specifically, the position index may be in units of 1 bit. That is, the start bit of the TPC command field may be in any position in the DCI. Or the position index may be in units of 2 bits. That is, the start bit of the TPC command field may be any even bit in the bits of the DCI (e.g. the index of bit is 0, 2, 4, ... ).

The position index of TPC command comprises a position index of at least one TPC command. Each TPC command corresponds to a BWP or a closed-loop power control process corresponding to a BWP. If the TPC command field includes position indexes of multiple TPC commands and each TPC command corresponds to a BWP or a closed-loop power control process on a BWP, the network side may configure independent position indexes for the multiple TPC commands. That is, the network side can independently configure a position index of TPC command for each BWP or each closed-loop power control process. For example, the k-th position index corresponds to the TPC command of the k-th BWP or the k-th closed-loop power control process.

Typically, the TPC command field occupies continuous bits in the DCI. For example, if the TPC command field comprises 2 TPC commands, the two TPC commands are two continuous TPC commands in the DCI.

The position index of TPC command indicates the k-th bit, and the number of bits of the TPC command field is M, then the bits occupied by the TPC command field of the terminal device are the {k, k+1, . . . , k+M−1} bits in the DCI.

This embodiment may further include the following steps:

determining a transmission power of the uplink signal of the terminal device based on a closed-loop power adjustment factor of the BWP that currently transmits the uplink signal by the terminal device, or a closed-loop power adjustment factor of a closed-loop power control process currently used by the uplink signal which is transmitted by the terminal device; and receiving the uplink signal transmitted by the terminal device based on the determined transmission power. The method of determining the transmission power of the uplink signal may be calculated based on any closed-loop power adjustment factor, and the manner of calculation is not described herein.

It can be seen that, by adopting the foregoing solution, the corresponding TPC command can be determined based on the number of BWPs of the uplink signal or the number of the closed-loop power control processes, and the power adjustment factor corresponding to the uplink signal is determined based on the TPC command, thereby reducing DCI overhead of the TPC command of one terminal as much as possible, saving unnecessary DCI overhead, and performing closed-loop power control of more terminals and more BWPs through one DCI.

Embodiment 3

Figure 3:
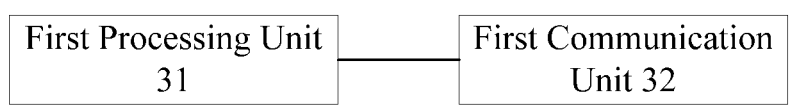
FIG. 3 is a structural block diagram of a terminal device provided by an embodiment of the present application.

An embodiment of the present application provides a terminal device, as shown in FIG. 3, comprising:

a first processing unit 31, configured to determine number of bits of a Transmission Power Control TPC command field of the terminal device in Downlink Control Information DCI based on number of Bandwidth Parts BWPs transmitting an uplink signal or number of closed-loop power control processes associated with an uplink signal; and configured to determine a closed-loop power adjustment factor of at least one BWP transmitting the uplink signal or a closed-loop power adjustment factor of at least one closed-loop power control process associated with the uplink signal based on a TPC command in the TPC command field.

The terminal device in this embodiment can be understood as a terminal with a communication function in a communication system, such as a mobile phone or the like.

The above first processing unit 31 may perform at least one of the following:

determining the number of the closed-loop power control processes associated with the uplink signal based on a current transmission type of the uplink signal; that is, determining based on a transmission type of the current uplink signal;

determining the number of the closed-loop power control processes associated with the uplink signal based on configuration of a high-layer signaling;

determining the number of the closed-loop power control processes associated with the uplink signal based on the number of BWPs which transmit the uplink signal and the number of the closed-loop power control processes on each BWP which transmits the uplink signal;

determining the number of the closed-loop power control processes associated with the uplink signal based on a first correspondence configured by a high-layer signaling when the uplink signal is PUSCH, wherein the first correspondence is a correspondence between an SRI state and a closed-loop power control process;

determining the number of the closed-loop power control processes associated with the uplink signal based on a second correspondence configured by a high-layer signaling when the uplink signal is PUCCH, wherein the second correspondence is a correspondence between PUCCH-spatial correlation info and a closed-loop power control process;

determining the number of the closed-loop power control processes associated with the uplink signal based on a third correspondence configured by a high-layer signaling when the uplink signal is SRS, wherein the third correspondence is a correspondence between an SRI-spatial correlation info and a closed-loop power control process.

Further, the first processing unit 31 is configured to determine the number of the closed-loop power control processes associated with the uplink signal based on that the uplink signal is grant-free type or scheduling-based type; for example, the uplink signal is an uplink signal based on grant-free (terminal autonomous transmission) or an uplink signal based on scheduling, and a corresponding number is determined based on this kind of type, for example, the number of the closed-loop power control processes associated with the uplink signal based on grant-free is 1; the number of the associated closed-loop power control processes based on scheduling is 2 or a value configured by a network side;

and/or, configured to determine the number of the closed-loop power control processes for each BWP based on a transmission type on each BWP in the at least one BWP when the terminal device configures at least one BWP; wherein the at least one can be understood as one, of course, and more.

When the number of the closed-loop power control processes associated with the uplink signal is determined based on configuration of a high-layer signaling, a number of the PUSCH and the PUCCH may be independently configured. If the terminal is configured with multiple BWPs, the network side can respectively configure a number of the closed-loop power control processes for each BWP.

The first processing unit 31 is configured to take a total number of the closed-loop power control processes included in all BWPs transmitting the uplink signal as the number of the closed-loop power control processes associated with the uplink signal.

That is, it is determined based on the number of BWPs transmitting the uplink signal and the number of the closed-loop power control processes on each BWP.

Specifically, the number of BWPs transmitting the uplink signal may be one of the following: number of BWPs which simultaneously transmit the uplink signal; number of uplink BWPs which are currently activated; number of uplink BWPs which are configured by a network side for the terminal device.

It should be noted that, for the latter two cases, these BWPs may not be simultaneously used to transmit the uplink signal and only one or part of the BWPs can be used to transmit the uplink signal at the same time. The terminal may transmit the uplink signal by using different BWPs at different times.

The first processing unit 31 performs at least one of the following three cases:

Case 1:

The number of different closed-loop power control processes included in the first correspondence is determined as the number of the closed-loop power control processes associated with the uplink signal.

For example, if the first correspondence indicates that all SRI states correspond to a same closed-loop power control process, the number of the closed-loop power control processes is 1. If the correspondence indicates that part of SRI states correspond to a closed-loop power control process 0 and other SRI states correspond to a closed-loop power control process 1, the number of the closed-loop power control processes is 2.

Case 2:

The number of the closed-loop power control processes associated with the uplink signal is determined to be 1 when the uplink signal is PUSCH and the terminal device is not configured with the SRI or the first correspondence.

The number of the closed-loop power control processes associated with the uplink signal is determined to be 1 when the uplink signal is PUSCH and the terminal device is not configured with the SRI or the first correspondence, that is, if the terminal is not configured with the SRI or the correspondence between the SRI state and the closed-loop power control process, the number of the closed-loop power control processes is 1.

Case 3:

The number of the closed-loop power control processes associated with the uplink signal is determined based on the first correspondence configured on each BWP in at least one BWP when the uplink signal is PUSCH and the terminal device is configured with the at least one BWP.

The number of the closed-loop power control processes associated with the uplink signal is determined based on the first correspondence configured on each BWP in at least one BWP when the uplink signal is PUSCH and the terminal device is configured with the at least one BWP. That is, if the terminal is configured with multiple BWPs, the number can be respectively determined based on the correspondence configured on each BWP.

It should be noted that the first correspondence may be understood as a correspondence between the SRI state and the closed-loop power control process. The SRI is an SRS Resource indicator, which can be obtained by scheduling DCI of the PUSCH to carry the SRI.

The number of the closed-loop power control processes associated with the uplink signal is determined based on a second correspondence configured by a high-layer signaling when the uplink signal is PUCCH. That is, if the uplink signal is PUCCH, a number of the different closed-loop power control processes included in the correspondence can be determined based on a correspondence, which is configured by a high-layer signaling, between PUCCH-Spatial Relation Info and a closed-loop power control process. Specifically, it may include:

The first processing unit 31 may perform at least one of the following three cases:

Case 1:

The terminal may determine number of different closed-loop power control processes included in the second correspondence as the number of the closed-loop power control processes associated with the uplink signal.

For example, if the correspondence indicates that all PUCCH-Spatial Relation Info correspond to a same closed-loop power control process, the number of the closed-loop power control processes is 1. If the second correspondence indicates that part of PUCCH-Spatial Relation Info correspond to a closed-loop power control process 0 and other PUCCH-Spatial Relation Info correspond to a closed-loop power control process 1, the number of the closed-loop power control processes is 2.

Case 2:

The number of the closed-loop power control processes associated with the uplink signal is determined to be 1 when the uplink signal is PUCCH and the terminal device is not configured with the PUCCH-spatial correlation info or the second correspondence.

If the terminal is not configured with PUCCH-Spatial Relation Info or a second correspondence between the PUCCH-Spatial Relation Info and the closed-loop power control process, the number of the closed-loop power control processes is 1.

Case 3:

The first processing unit 31 is configured to determine the number of the closed-loop power control processes associated with the uplink signal based on a second correspondence configured on each BWP in at least one BWP when the uplink signal is PUCCH and the terminal device is configured with the at least one BWP. That is to say, if the terminal is configured with multiple BWPs, the number can be respectively determined based on the second correspondence configured on each BWP.

The number of the closed-loop power control processes associated with the uplink signal is determined based on a third correspondence configured by a high-layer signaling when the uplink signal is SRS. That is, if the uplink signal is SRS, a number of the different closed-loop power control processes included in the correspondence can be determined based on a correspondence, which is configured by a high-layer signaling, between SRS-Spatial Relation Info and a closed-loop power control process. Specifically, the first processing unit 31 may perform at least one of the following three cases:

Case 1:

The terminal may determine number of different closed-loop power control processes included in the third correspondence as the number of the closed-loop power control processes associated with the uplink signal.

For example, if the third correspondence indicates that all SRS-Spatial Relation Info correspond to a same closed-loop power control process, the number of the closed-loop power control processes is 1. If the third correspondence indicates that part of SRS-Spatial Relation Info correspond to a closed-loop power control process 0 and other SRS-Spatial Relation Info correspond to a closed-loop power control process 1, the number of the closed-loop power control processes is 2.

Case 2:

The number of the closed-loop power control processes associated with the uplink signal is determined to be 1 when the uplink signal is SRS and the terminal device is not configured with the SRS-spatial correlation info or the third correspondence.

That is, if the terminal is not configured with SRS-Spatial Relation Info or a third correspondence between the SRS-Spatial Relation Info and the closed-loop power control process, the number of the closed-loop power control processes is 1.

Case 3:

The first processing unit 31 is configured to determine the number of the closed-loop power control processes associated with the uplink signal based on the third correspondence configured on each BWP in at least one BWP when the uplink signal is SRS and the terminal device is configured with the at least one BWP. That is to say, if the terminal is configured with multiple BWPs, the number can be respectively determined based on the correspondence configured on each BWP.

The number of BWPs transmitting the uplink signal may be number of BWPs which simultaneously transmit the uplink signal, number of uplink BWPs which are currently activated, or number of uplink BWPs which are configured by a network side for the terminal device. For the latter two cases, these BWPs are not always possible to simultaneously transmit the uplink signal, and only one or part of the BWPs can be used to transmit the uplink signal at the same time. The terminal may transmit the uplink signal by using different BWPs at different times.

Before determining the number of BWPs transmitting the uplink signal or the number of the closed-loop power control processes associated with the uplink signal, the method further comprises: determining that the number of bits of the TPC command field in the DCI is 2. Specifically, the DCI includes a TPC command field of the terminal. For example, before the terminal receives the number of BWPs configured by the network side or the number of the closed-loop power control processes associated with the uplink signal, the terminal assumes that the number of bits of the TPC command field in the DCI is 2.

The number of bits in the TPC command field is determined to be $2*N$ or $2+\log 2(N)$ if the number of BWPs transmitting the uplink signal is N or the number of the closed-loop power control processes associated with the uplink signal is N.

The DCI is at least one of the following: DCI carrying a TPC command of PUSCH; DCI carrying a TPC command of PUCCH; DCI carrying a TPC command of SRS.

It should be noted that the format of the DCI may be: DCI format 2-2 or DCI format 2-3, and the DCI is scrambled by using PUSCH-TPC-RNTI or PUCCH-TPC-RNTI or SRS-TPC-RNTI. The DCI can be used to indicate a TPC command on a BWP, and can also be used to indicate a TPC command on different BWPs.

The uplink signal is one of the following: PUSCH, PUCCH and SRS.

Specifically, if the uplink signal is PUSCH or PUCCH, the format of the DCI is DCI format 2-2, and is scrambled by PUSCH-TPC-RNTI or PUCCH-TPC-RNTI. If the uplink signal is SRS, then the format of the DCI is DCI format 2-3 and is scrambled by SRS-TPC-RNTI.

Based on the above solutions, the embodiment may provide a processing method for further determining a TPC command field. For example, the method may further comprises: Determining the TPC command field of the terminal device from the DCI based on a position index of TPC command indicated by a network side and a number of bits of the TPC command field.

According to the method of obtaining a position index of a TPC command, the terminal device further includes:

a first communication unit 32, configured to receive the position index of TPC command indicated by a network side through a RRC signaling, and configured to receive the position index of TPC command indicated by the network side through a RRC signaling; wherein the position index of TPC command indicates a start bit of the TPC command field of the terminal device in the DCI.

Specifically, the position index may be in units of 1 bit. That is, the start bit of the TPC command field may be in any position in the DCI. Or the position index may be in units of 2 bits. That is, the start bit of the TPC command field may be any even bit in the bits of the DCI (e.g. the index of bit is 0, 2, 4, ... ).

The position index of TPC command comprises a position index of at least one TPC command. Each TPC command corresponds to a BWP or a closed-loop power control process corresponding to a BWP. If the TPC command field includes position indexes of multiple TPC commands and each TPC command corresponds to a BWP or a closed-loop power control process on a BWP, the network side may configure independent position indexes for the multiple TPC commands. That is, the network side can independently configure a position index of TPC command for each BWP or each closed-loop power control process. For example, the k-th position index corresponds to the TPC command of the k-th BWP or the k-th closed-loop power control process.

Typically, the TPC command field occupies continuous bits in the DCI. For example, if the TPC command field comprises 2 TPC commands, the two TPC commands are two continuous TPC commands in the DCI.

The position index of TPC command indicates the k-th bit, and the number of bits of the TPC command field is M, then the bits occupied by the TPC command field of the terminal device are the $\{k, k+1, \ldots, k+M-1\}$ bits in the DCI.

If the TPC command field is $2*N$ bits, it includes N 2-bit TPC commands and the n-th TPC command is used for the n-th BWP or the n-th closed-loop power control process; if the TPC command field is $2+\log 2(N)$ bits, the first two bits are a TPC command and the subsequent log 2(N) bits indicate the BWP or closed-loop power control process corresponding to the TPC command, or the last two bits are a TPC command and the preceding log 2 (N) bits indicate the BWP or closed-loop power control process corresponding to the TPC command.

This embodiment may further include:

the first communication unit, configured to transmit the uplink signal based on the determined transmission power.

the first processing unit, configured to determine a transmission power of the uplink signal based on a closed-loop power adjustment factor of a BWP currently transmitting the uplink signal or a closed-loop power adjustment factor of a closed-loop power control process currently used by the uplink signal.

It can be seen that, by adopting the foregoing solution, the corresponding TPC command can be determined based on the number of BWPs of the uplink signal or the number of the closed-loop power control processes, and the power adjustment factor corresponding to the uplink signal is determined based on the TPC command, thereby reducing DCI overhead of the TPC command of one terminal as much as possible, saving unnecessary DCI overhead, and performing closed-loop power control of more terminals and more BWPs through one DCI.

Embodiment 4

Figure 4:
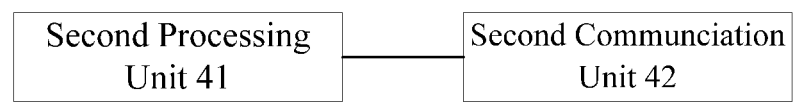
FIG. 4 is a structural block diagram of a network device provided by an embodiment of the present application.

An embodiment of the present application provides a network device, as shown in FIG. 4, comprising:

a second processing unit 41, configured to determine number of bits of a Transmission Power Control TPC command field of a terminal device in Downlink Control Information DCI based on number of Bandwidth Parts BWPs transmitting an uplink signal or number of closed-loop power control processes associated with an uplink signal;

a second communication unit 42, configured to transmit the TPC command field to the terminal device through the DCI. The terminal device in this embodiment can be understood as a terminal with a communication function in a communication system, such as a mobile phone or the like.

The above second processing unit 41 performs at least one of the following:

determining the number of the closed-loop power control processes associated with the uplink signal based on a current transmission type of the uplink signal; that is, determining based on a transmission type of the current uplink signal;

determining the number of the closed-loop power control processes associated with the uplink signal based on configuration of a high-layer signaling;

determining the number of the closed-loop power control processes associated with the uplink signal based on the number of BWPs which transmit the uplink signal and the number of the closed-loop power control processes on each BWP which transmits the uplink signal;

determining the number of the closed-loop power control processes associated with the uplink signal based on a first correspondence configured by a high-layer signaling when the uplink signal is PUSCH, wherein the first correspondence is a correspondence between an SRI state and a closed-loop power control process;

determining the number of the closed-loop power control processes associated with the uplink signal based on a second correspondence configured by a high-layer signaling when the uplink signal is PUCCH, wherein the second correspondence is a correspondence between PUCCH-spatial correlation info and a closed-loop power control process;

determining the number of the closed-loop power control processes associated with the uplink signal based on a third correspondence configured by a high-layer signaling when the uplink signal is SRS, wherein the third correspondence is a correspondence between an SRI-spatial correlation info and a closed-loop power control process.

Further, the second processing unit 41 is configured to determine the number of the closed-loop power control processes associated with the uplink signal based on that the uplink signal is grant-free type or scheduling-based type; for example, the uplink signal is an uplink signal based on grant-free (terminal autonomous transmission) or an uplink signal based on scheduling, and a corresponding number is determined based on this kind of type, for example, the number of the closed-loop power control processes associated with the uplink signal based on grant-free is 1; the number of the associated closed-loop power control processes based on scheduling is 2 or a value configured by a network side;

and/or, configured to determine the number of the closed-loop power control processes for each BWP based on a transmission type on each BWP in the at least one BWP when the terminal device configures at least one BWP; wherein the at least one can be understood as one, of course, and more.

When the number of the closed-loop power control processes associated with the uplink signal is determined based on configuration of a high-layer signaling, a number of the PUSCH and the PUCCH may be independently configured. If the terminal is configured with multiple BWPs, the network side can respectively configure a number of the closed-loop power control processes for each BWP.

The second processing unit 41 is configured to take a total number of the closed-loop power control processes included in all BWPs transmitting the uplink signal as the number of the closed-loop power control processes associated with the uplink signal.

That is, it is determined based on the number of BWPs transmitting the uplink signal and the number of the closed-loop power control processes on each BWP.

Specifically, the number of BWPs transmitting the uplink signal may be one of the following: number of BWPs which simultaneously transmit the uplink signal; number of uplink BWPs which are currently activated; number of uplink BWPs which are configured by a network side for the terminal device.

It should be noted that, for the latter two cases, these BWPs may not be simultaneously used to transmit the uplink signal and only one or part of the BWPs can be used to transmit the uplink signal at the same time. The terminal may transmit the uplink signal by using different BWPs at different times.

The second processing unit 41 performs at least one of the following three types:

Case 1:

The number of different closed-loop power control processes included in the first correspondence is determined as the number of the closed-loop power control processes associated with the uplink signal.

For example, if the first correspondence indicates that all SRI states correspond to a same closed-loop power control process, the number of the closed-loop power control processes is 1.If the correspondence indicates that part of SRI states correspond to a closed-loop power control process 0 and other SRI states correspond to a closed-loop power control process 1, the number of the closed-loop power control processes is.

Case 2:

The number of the closed-loop power control processes associated with the uplink signal is determined to be 1 when the uplink signal is PUSCH and the terminal device is not configured with the SRI or the first correspondence.

The number of the closed-loop power control processes associated with the uplink signal is determined to be 1 when the uplink signal is PUSCH and the terminal device is not configured with the SRI or the first correspondence. That is, if the terminal is not configured with the SRI or the correspondence between the SRI state and the closed-loop power control process, the number of the closed-loop power control processes is 1.

Case 3:

The number of the closed-loop power control processes associated with the uplink signal is determined based on the first correspondence configured on each BWP in at least one BWP when the uplink signal is PUSCH and the terminal device is configured with the at least one BWP.

The number of the closed-loop power control processes associated with the uplink signal is determined based on the first correspondence configured on each BWP in at least one BWP when the uplink signal is PUSCH and the terminal device is configured with the at least one BWP. That is, if the terminal is configured with multiple BWPs, the number can be respectively determined based on the correspondence configured on each BWP.

It should be noted that the first correspondence may be understood as a correspondence between the SRI state and the closed-loop power control process. The SRI is an SRS Resource indicator, which can be obtained by scheduling DCI of the PUSCH to carry the SRI.

The number of the closed-loop power control processes associated with the uplink signal is determined based on a second correspondence configured by a high-layer signaling when the uplink signal is PUCCH. That is, if the uplink signal is PUCCH, a number of the different closed-loop power control processes included in the correspondence can be determined based on a correspondence, which is configured by a high-layer signaling, between PUCCH-Spatial Relation Info and a closed-loop power control process. Specifically, it may include:

The second processing unit 41 may perform at least one of the following three cases:

Case 1:

The terminal may determine number of different closed-loop power control processes included in the second correspondence as the number of the closed-loop power control processes associated with the uplink signal.

For example, if the correspondence indicates that all PUCCH-Spatial Relation Info correspond to a same closed-loop power control process, the number of the closed-loop power control processes is 1. If the second correspondence indicates that part of PUCCH-Spatial Relation Info correspond to a closed-loop power control process 0 and other PUCCH-Spatial Relation Info correspond to a closed-loop power control process 1, the number of the closed-loop power control processes is 2.

Case 2:

The number of the closed-loop power control processes associated with the uplink signal is determined to be 1 when the uplink signal is PUCCH and the terminal device is not configured with the PUCCH-spatial correlation info or the second correspondence.

If the terminal is not configured with PUCCH-Spatial Relation Info or a second correspondence between the PUCCH-Spatial Relation Info and the closed-loop power control process, the number of the closed-loop power control processes is 1.

Case 3:

The second processing unit 41 is configured to determine the number of the closed-loop power control processes associated with the uplink signal based on a second correspondence configured on each BWP in at least one BWP when the uplink signal is PUCCH and the terminal device is configured with the at least one BWP. That is to say, if the terminal is configured with multiple BWPs, the number can be respectively determined based on the second correspondence configured on each BWP.

The number of the closed-loop power control processes associated with the uplink signal is determined based on a third correspondence configured by a high-layer signaling when the uplink signal is SRS. That is, if the uplink signal is SRS, a number of the different closed-loop power control processes included in the correspondence can be determined based on a correspondence, which is configured by a high-layer signaling, between SRS-Spatial Relation Info and a closed-loop power control process. Specifically, the second processing unit 41 may perform at least one of the following three cases:

Case 1:

The terminal may determine number of different closed-loop power control processes included in the third correspondence as the number of the closed-loop power control processes associated with the uplink signal.

For example, if the third correspondence indicates that all SRS-Spatial Relation Info correspond to a same closed-loop power control process, the number of the closed-loop power control processes is 1. If the third correspondence indicates that part of SRS-Spatial Relation Info correspond to a closed-loop power control process 0 and other SRS-Spatial Relation Info correspond to a closed-loop power control process 1, the number of the closed-loop power control processes is 2.

Case 2:

The number of the closed-loop power control processes associated with the uplink signal is determined to be 1 when the uplink signal is SRS and the terminal device is not configured with the SRS-spatial correlation info or the third correspondence.

That is, if the terminal is not configured with SRS-Spatial Relation Info or a third correspondence between the SRS-Spatial Relation Info and the closed-loop power control process, the number of the closed-loop power control processes is 1.

Case 3:

The second processing unit 41 is configured to determine the number of the closed-loop power control processes associated with the uplink signal based on the third correspondence configured on each BWP in at least one BWP when the uplink signal is SRS and the terminal device is configured with the at least one BWP. That is to say, if the terminal is configured with multiple BWPs, the number can be respectively determined based on the correspondence configured on each BWP.

The number of BWPs transmitting the uplink signal may be number of BWPs which simultaneously transmit the uplink signal, number of uplink BWPs which are currently activated, or number of uplink BWPs which are configured by a network side for the terminal device. For the latter two cases, these BWPs are not always possible to simultaneously transmit the uplink signal, and only one or part of the BWPs can be used to transmit the uplink signal at the same time. The terminal may transmit the uplink signal by using different BWPs at different times.

Before determining the number of BWPs transmitting the uplink signal or the number of the closed-loop power control processes associated with the uplink signal, the method further comprises: determining that the number of bits of the TPC command field in the DCI is 2. Specifically, the DCI includes a TPC command field of the terminal. For example, before the terminal receives the number of BWPs configured by the network side or the number of the closed-loop power control processes associated with the uplink signal, the terminal assumes that the number of bits of the TPC command field in the DCI is 2.

The number of bits in the TPC command field is determined to be 2*N or 2+log 2(N) if the number of BWPs transmitting the uplink signal is N or the number of the closed-loop power control processes associated with the uplink signal is N.

The DCI is at least one of the following: DCI carrying a TPC command of PUSCH; DCI carrying a TPC command of PUCCH; DCI carrying a TPC command of SRS.

It should be noted that the format of the DCI may be: DCI format 2-2 or DCI format 2-3; and the DCI is scrambled by using PUSCH-TPC-RNTI or PUCCH-TPC-RNTI or SRS-TPC-RNTI. The DCI can be used to indicate a TPC command on a BWP, and can also be used to indicate a TPC command on different BWPs.

The uplink signal is one of the following: PUSCH, PUCCH and SRS.

Specifically, if the uplink signal is PUSCH or PUCCH, the format of the DCI is DCI format 2-2, and is scrambled by PUSCH-TPC-RNTI or PUCCH-TPC-RNTI. If the uplink signal is SRS, then the format of the DCI is DCI format 2-3 and is scrambled by SRS-TPC-RNTI.

Based on the above solutions, the embodiment may provide a processing method for further determining a TPC command field. For example, the method may further comprises: indicating a position index of TPC command to the terminal device to cause the terminal device to determine the TPC command field from the DCI based on a position of TPC command and a number of bits of the TPC command field.

The method of obtaining a position index of TPC command may be: indicating, by the network device, the position index of TPC command through a RRC signaling. The position index of TPC command indicates a start bit of the TPC command field of the terminal device in the DCI.

Specifically, the position index may be in units of 1 bit. That is, the start bit of the TPC command field may be in any position in the DCI. Or the position index may be in units of 2 bits. That is, the start bit of the TPC command field may be any even bit in the bits of the DCI (e.g. the index of bit is 0, 2, 4, . . . ).

The position index of TPC command comprises a position index of at least one TPC command. Each TPC command corresponds to a BWP or a closed-loop power control process corresponding to a BWP. If the TPC command field includes position indexes of multiple TPC commands and each TPC command corresponds to a BWP or a closed-loop power control process on a BWP, the network side may configure independent position indexes for the multiple TPC commands. That is, the network side can independently configure a position index of TPC command for each BWP or each closed-loop power control process. For example, the k-th position index corresponds to the TPC command of the k-th BWP or the k-th closed-loop power control process.

Typically, the TPC command field occupies continuous bits in the DCI. For example, if the TPC command field comprises 2 TPC commands, the two TPC commands are two continuous TPC commands in the DCI.

The position index of TPC command indicates the k-th bit, and the number of bits of the TPC command field is M, then the bits occupied by the TPC command field of the terminal device are the {k, k+1, . . . , k+M−1} bits in the DCI.

This embodiment may further include:

the second processing unit 41, configured to determine a transmission power of the uplink signal of the terminal device based on a closed-loop power adjustment factor of the BWP that currently transmits the uplink signal by the terminal device, or a closed loop power adjustment factor of a closed loop power control process currently used by the uplink signal which is transmitted by the terminal device;

the second communication unit 42, configured to receive the uplink signal transmitted by the terminal device based on the determined transmission power.

It can be seen that, by adopting the foregoing solution, the corresponding TPC command can be determined based on the number of BWPs of the uplink signal or the number of the closed-loop power control processes, and the power adjustment factor corresponding to the uplink signal is determined based on the TPC command, thereby reducing DCI overhead of the TPC command of one terminal as much as possible, saving unnecessary DCI overhead, and performing closed-loop power control of more terminals and more BWPs through one DCI.

Figure 5:
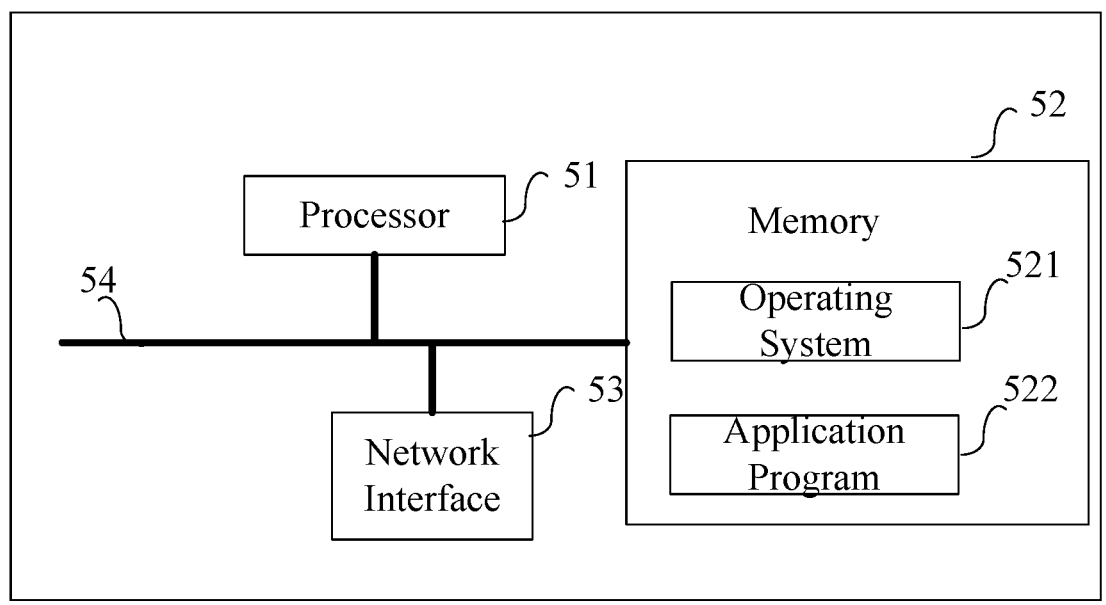
FIG. 5 is a block diagram of hardware architecture of an embodiment of the present application.

The embodiment of the present application further provides a terminal device, or a hardware component architecture of a network device, as shown in FIG. 5, comprising: at least one processor 51, a memory 52, and at least one network interface 53. The various components are coupled together via a bus system 54. It can be understood that the bus system 54 is used to implement connection communication between these components. The bus system 54 includes, in addition to a data bus, a power bus, a control bus, and a status signal bus. However, for clarity of description, various buses are all labeled as the bus system 54 in FIG. 5.

It can be understood that the memory 52 in the embodiments of the present application may be a volatile memory or a non-volatile memory, or may include both volatile and non-volatile memory.

In some embodiments, the memory 52 stores the following elements, executable modules or data structures, or a subset thereof, or an extension set thereof:

an operating system 521 and an application program 522.

The processor 51 is configured to: be able to process the steps of the methods of the first embodiment or the second embodiment, and details are not described herein.

The above apparatus of the embodiments of the application, if implemented in the form of the software functional unit and sold or used as a standalone product, may be stored in a computer-readable storage medium. Based on such an understanding, the technical solutions of the embodiments of the application in essence or the part that contributes to the prior art may be embodied in the form of a software product. The computer software product is stored in a storage medium and includes a plurality of instructions for a computer device (which may be a personal computer, a server, a network device or the like) to execute all or part of the methods described in the embodiments of the present application. The foregoing storage medium includes various media that may store program code, such as a USB flash disk, a mobile hard disk, a Read-Only Memory (ROM), a magnetic disk, an optical disk. Thus, the embodiments of the present application are not limited to any specific combination of hardware and software.

A computer storage medium is provided by the embodiments of the present application, wherein the computer storage medium stores computer executable instructions. When the computer executable instructions are executed, the steps of the methods of the first embodiment or the second embodiment described above are implemented.

While the preferred embodiments of the present application have been disclosed for purposes of illustration, those skilled in the art will recognize that various modifications, additions and substitutions are possible. Thus, the scope of the present application should not be limited to the embodiments described above.

What is claimed is:

1. A method of uplink power control, which is applied to a terminal device, comprising:
   determining a number N of closed-loop power control processes associated with an uplink signal based on configuration of a high-layer signaling;
   predetermining a number of bits of a Transmission Power Control TPC command field of the terminal device in Downlink Control Information DCI based on the number N of the closed-loop power control processes associated with the uplink signal;
   wherein the number of bits of the TPC command field in the DC is 2*N bits or 2+log 2(N) bits;
   wherein N is a positive integer.

2. The method according to claim 1, wherein the method further comprises at least one of the following:
   determining the number of the closed-loop power control processes associated with the uplink signal based on a current transmission type of the uplink signal;
   determining the number of the closed-loop power control processes associated with the uplink signal based on a number of Bandwidth Parts BWPs which transmit the uplink signal and the number of the closed-loop power control processes on each BWP which transmits the uplink signal;
   determining the number of the closed-loop power control processes associated with the uplink signal based on a first correspondence configured by a high-layer signaling when the uplink signal is PUSCH, wherein the first correspondence is a correspondence between an SRI state and a closed-loop power control process;
   determining the number of the closed-loop power control processes associated with the uplink signal based on a second correspondence configured by a high-layer signaling when the uplink signal is PUCCH, wherein the second correspondence is a correspondence between PUCCH-spatial correlation info and a closed-loop power control process; and
   determining the number of the closed-loop power control processes associated with the uplink signal based on a third correspondence configured by a high-layer signaling when the uplink signal is SRS, wherein the third correspondence is a correspondence between an SRS-spatial correlation info and a closed-loop power control process.

3. The method according to claim 1, wherein the DCI is at least one of the following:
   DCI carrying a TPC command of PUSCH;
   DCI carrying a TPC command of PUCCH; and
   DCI carrying a TPC command of SRS.

4. The method according to claim 1, wherein the uplink signal is one of the following: PUSCH, PUCCH, SRS.

5. The method according to claim 1, wherein the method further comprises:
   determining the TPC command field of the terminal device from the DCI based on a position index of TPC command indicated by a network side and a number of bits of the TPC command field.

6. The method according to claim 5, wherein the position index of TPC command comprises a position index of at least one TPC command;
   wherein each TPC command corresponds to a closed-loop power control process of a BWP.

7. The method according to claim 1, wherein the TPC command field occupies continuous bits in the DCI.

8. The method according to claim 1, wherein the method further comprises:
   determining a transmission power of the uplink signal based on a closed-loop power adjustment factor of a BWP currently transmitting the uplink signal or a closed-loop power adjustment factor of a closed-loop power control process currently used by the uplink signal; and
   transmitting the uplink signal based on the determined transmission power.

9. The method according to claim 1, further comprising determining a closed-loop power adjustment factor of at least one closed-loop power control process associated with the uplink signal based on a TPC command in the TPC command field.

10. A method of uplink power control, which is applied to a network device, comprising:
    determining a number N of closed-loop power control processes associated with an uplink signal based on configuration of a high-layer signaling;
    predetermining a number of bits of a Transmission Power Control TPC command field of a terminal device in Downlink Control Information DCI based on the number N of the closed-loop power control processes associated with the uplink signal,
    wherein the number of bits of the TPC command field in the DC is 2*N bits or 2+log 2(N) bits;
    wherein N is a positive integer; and
    transmitting the TPC command field to the terminal device through the DCI.

11. The method according to claim 10, wherein the method further comprises at least one of the following:
    determining the number of the closed-loop power control processes associated with the uplink signal based on a current transmission type of the uplink signal;
    determining the number of the closed-loop power control processes associated with the uplink signal based on a number of Bandwidth Parts BWPs which transmit the uplink signal and the number of the closed-loop power control processes on each BWP which transmits the uplink signal;
    determining the number of the closed-loop power control processes associated with the uplink signal based on a first correspondence configured by a high-layer signaling when the uplink signal is PUSCH, wherein the first correspondence is a correspondence between an SRI state and a closed-loop power control process;
    determining the number of the closed-loop power control processes associated with the uplink signal based on a second correspondence configured by a high-layer signaling when the uplink signal is PUCCH, wherein the second correspondence is a correspondence between PUCCH-spatial correlation info and a closed-loop power control process; and determining the number of the closed-loop power control processes associated with the uplink signal based on a third correspondence configured by a high-layer signaling when the uplink signal is SRS, wherein the third correspondence is a correspondence between an SRS-spatial correlation info and a closed-loop power control process.

12. A terminal device, comprising a processor and a memory for storing computer programs executable on the processor, wherein the processor is configured to perform a methods of uplink power control, wherein the method comprises:

determining a number N of closed-loop power control processes associated with an uplink signal based on configuration of a high-layer signaling;

predetermining a number of bits of a Transmission Power Control TPC command field of the terminal device in Downlink Control Information DCI based on the number N of the closed-loop power control processes associated with the uplink signal;

wherein the number of bits of the TPC command field in the DCI is 2*N bits or 2+log 2(N) bits;

wherein N is a positive integer.

13. The terminal device according to claim 12, wherein the method further comprises at least one of the following:

determining the number of the closed-loop power control processes associated with the uplink signal based on a current transmission type of the uplink signal;

determining the number of the closed-loop power control processes associated with the uplink signal based on a number of Bandwidth Parts BWPs which transmit the uplink signal and the number of the closed-loop power control processes on each BWP which transmits the uplink signal;

determining the number of the closed-loop power control processes associated with the uplink signal based on a first correspondence configured by a high-layer signaling when the uplink signal is PUSCH, wherein the first correspondence is a correspondence between an SRI state and a closed-loop power control process;

determining the number of the closed-loop power control processes associated with the uplink signal based on a second correspondence configured by a high-layer signaling when the uplink signal is PUCCH, wherein the second correspondence is a correspondence between PUCCH-spatial correlation info and a closed-loop power control process; and determining the number of the closed-loop power control processes associated with the uplink signal based on a third correspondence configured by a high-layer signaling when the uplink signal is SRS, wherein the third correspondence is a correspondence between an SRS-spatial correlation info and a closed-loop power control process.

14. The terminal device according to claim 12, wherein the DCI is at least one of the following:
DCI carry a TPC command of PUSCH;
DCI carry a TPC command of PUCCH; and
DCI carry a TPC command of SRS.

15. The terminal device according to claim 12, wherein the uplink signal is one of the following: PUSCH, PUCCH, SRS.

16. The terminal device according to claim 12, wherein the method further comprises:

determining the TPC command field of the terminal device from the DCI based on a position index of TPC command indicated by a network side and a number of bits of the TPC command field.

17. The terminal device according to claim 16, wherein the position index of TPC command comprises a position index of at least one TPC command;

wherein each TPC command corresponds to a closed-loop power control process of a BWP.

18. The terminal device according to claim 12, wherein the TPC command field occupies continuous bits in the DCI.

19. The terminal device according to claim 12, wherein the method further comprises:

determining a transmission power of the uplink signal based on a closed-loop power adjustment factor of a BWP currently transmitting the uplink signal or a closed-loop power adjustment factor of a closed-loop power control process currently used by the uplink signal; and transmitting the uplink signal based on the determined transmission power.

20. The terminal device according to claim 12, further comprising determining a closed-loop power adjustment factor of at least one closed-loop power control process associated with the uplink signal based on a TPC command in the TPC command field.

* * * * *